United States Patent
Adderly et al.

(10) Patent No.: US 10,123,159 B2
(45) Date of Patent: *Nov. 6, 2018

(54) DISTRIBUTED CELLULAR CLIENT TRACKING

(71) Applicant: International Business Machines Corporation, Armonk, NY (US)

(72) Inventors: Darryl M. Adderly, Morrisville, NC (US); Jonathan W. Jackson, Durham, NC (US); Ajit Jariwala, Cary, NC (US); Eric B. Libow, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/062,327

(22) Filed: Mar. 7, 2016

(65) Prior Publication Data
US 2016/0373895 A1 Dec. 22, 2016

Related U.S. Application Data

(63) Continuation of application No. 14/742,872, filed on Jun. 18, 2015.

(51) Int. Cl.
*H04W 24/00* (2009.01)
*H04W 4/02* (2018.01)
*H04W 4/029* (2018.01)

(52) U.S. Cl.
CPC ............ *H04W 4/02* (2013.01); *H04W 4/025* (2013.01); *H04W 4/028* (2013.01); *H04W 4/029* (2018.02)

(58) Field of Classification Search
CPC ....................................................... H04W 4/02
USPC ......... 455/456.1, 456.4, 562.1, 422.1, 456.5, 455/575.7, 82; 370/329, 310, 310.2, 328, 370/338
See application file for complete search history.

(56) References Cited

U.S. PATENT DOCUMENTS

| | | | |
|---|---|---|---|
| 6,072,784 A | 6/2000 | Agrawal et al. | |
| 7,567,822 B2 * | 7/2009 | Hart | H04W 16/18 370/310 |
| 7,606,570 B2 | 10/2009 | Karaoguz et al. | |
| 7,801,058 B2 | 9/2010 | Wang | |
| 7,822,023 B2 | 10/2010 | Lahetkangas et al. | |
| 8,051,057 B2 | 11/2011 | Abu-Hakima et al. | |
| 8,165,077 B2 | 4/2012 | Reddy | |

(Continued)

FOREIGN PATENT DOCUMENTS

KR 101394966 B1 5/2014

OTHER PUBLICATIONS

Anonymous, "Cellular Antenna Powers Off When Connected Via Wi-Fi," 3 pgs., IP.com No. 000211855 IP.com Electronic Publication: Oct. 21, 2011.

(Continued)

*Primary Examiner* — Amancio Gonzalez
(74) *Attorney, Agent, or Firm* — Nolan Lawrence

(57) ABSTRACT

A first cellular client determines its geographic location from a second cellular client. As part of this determination, the first cellular client disables its cellular functionality. The first cellular client receives a first identifier from the second cellular client by way of a non-cellular connection. The first identifier is related to a first antenna of a cellular service-provider. The first cellular client tracks its location based on the first identifier.

8 Claims, 3 Drawing Sheets

(56) References Cited

U.S. PATENT DOCUMENTS

| | | |
|---|---|---|
| 8,326,338 B1 | 12/2012 | Vasilevsky |
| 8,374,628 B1 | 2/2013 | Nelissen et al. |
| 8,385,976 B2 | 2/2013 | Middleton |
| 8,619,730 B2 | 12/2013 | Quigley et al. |
| 8,805,978 B1 | 8/2014 | Anthonisamy et al. |
| 8,935,326 B2 | 1/2015 | Tagg |
| 8,942,623 B2 | 1/2015 | Hillan |
| 8,958,784 B2 | 2/2015 | Chin et al. |
| 9,072,052 B2 * | 6/2015 | Griffin ............... H04W 52/0254 |
| 9,213,081 B2 * | 12/2015 | Tarlow ................. G01S 5/0257 |
| 9,615,200 B2 * | 4/2017 | Adderly ................. H04W 4/02 |
| 9,723,154 B2 * | 8/2017 | Damstra ............... H04M 15/60 |
| 2004/0008663 A1 | 1/2004 | Srikrishna et al. |
| 2009/0197585 A1 | 8/2009 | Aaron |
| 2013/0279478 A1 | 10/2013 | De Bruin et al. |
| 2014/0089508 A1 | 3/2014 | Hawver et al. |
| 2014/0148094 A1 | 5/2014 | Park et al. |
| 2014/0273963 A1 | 9/2014 | Su et al. |
| 2015/0052260 A1 | 2/2015 | Bott |
| 2015/0172858 A1 | 6/2015 | Choi et al. |
| 2016/0157168 A1 * | 6/2016 | Xue ...................... H04W 48/18 370/329 |

OTHER PUBLICATIONS

Anonymous, "Mobile Device Resource Conservation during Geo-Location Operations," IPCOM000231493D, IP.com No. 000231493, 18 pgs., Oct. 2, 2013.

Luqman et al., "Overseer: A Mobile Context-Aware Collaboration and Task Management System for Disaster Response," International Conference on Creating Connecting and Collaborating through Computing (C5), 2010 Eighth, 76-82, 10 pgs., IEEE.

Adderly et al., "Distributed Cellular Client Tracking," U.S. Appl. No. 14/142,872, filed, Jun. 18, 2015.

Adderly et al., "Distributed Cellular Client Network", U.S. Appl. No. 14/742,845, filed Jun. 18, 2015.

Adderly et al., "Distributed Cellular Client Network", U.S. Appl. No. 15/062,308, filed Mar. 7, 2016.

List of IBM Patents or Patent Applications Treated as Related, Mar. 1, 2016, 2 pages.

* cited by examiner

DISTRIBUTED CELLULAR CLIENT TRACKING

BACKGROUND

The present disclosure relates to distributing cellular signals, and more specifically, to distributing cellular signals for location tracking.

Cellular clients may use cellular networks to make telephone calls with other phones. Cellular clients may also use cellular networks to receive media, such as music and movies. Cellular clients may also use cellular networks to transmit media, such as pictures and videos. Cellular clients may include or be incorporated into cellular phones, computing devices, and automobiles.

SUMMARY

Disclosed herein are embodiments of a method and computer program product for determining geographic location. A first cellular client disables its cellular functionality. The first cellular client receives a first identifier from a second cellular client by way of a non-cellular connection. The first identifier is related to a first antenna of a cellular service-provider. The first cellular client tracks its location based on the first identifier.

Also disclosed herein are embodiments of a system for determining geographic location. A processor located in a first cellular client, and in communication with a memory that is also located within the first cellular client, disables its cellular functionality. The first cellular client receives a first identifier from a second cellular client by way of a non-cellular connection. The first identifier is related to a first antenna of a cellular service-provider. The first cellular client tracks its location based on the first identifier.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
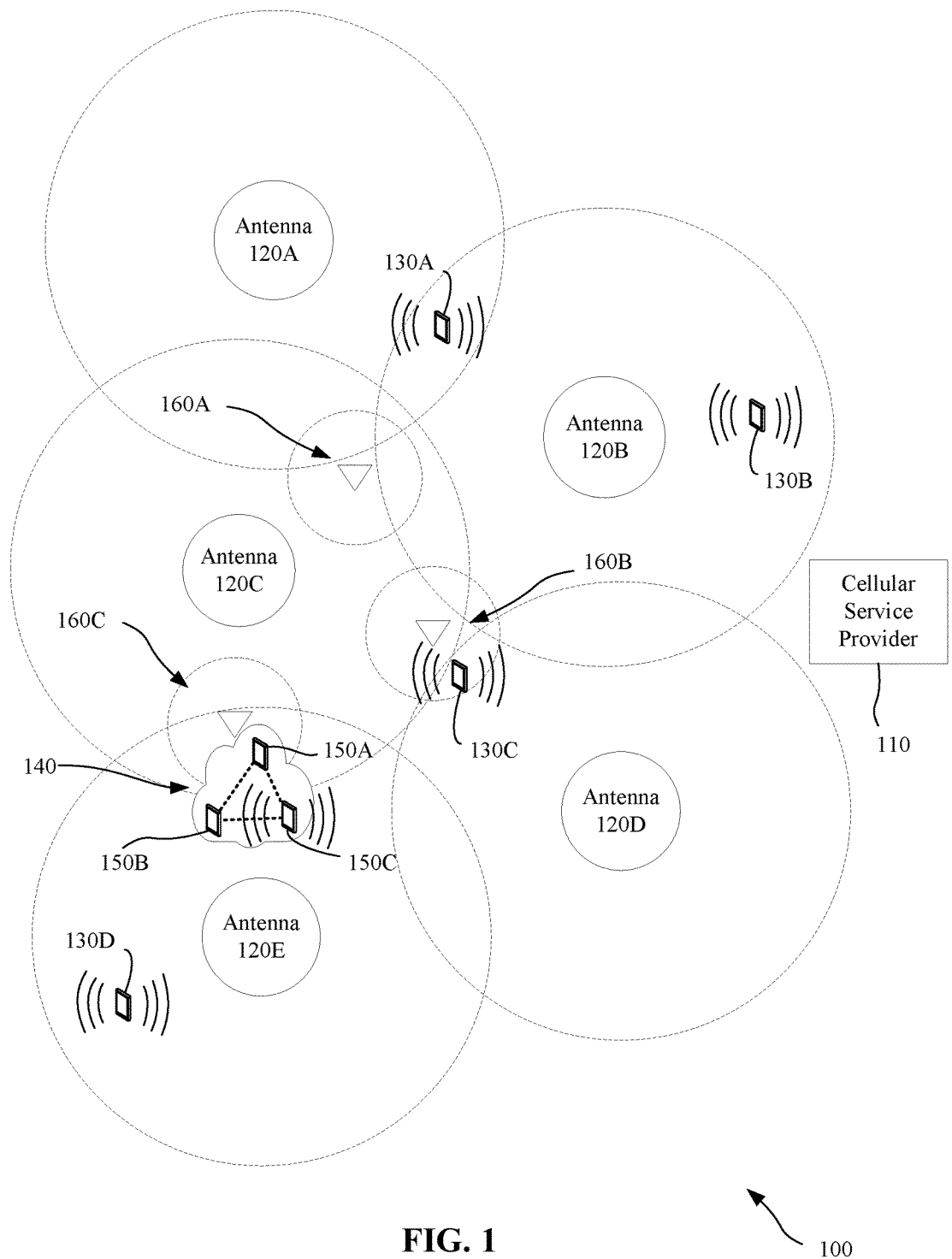
FIG. 1 depicts an example location tracking network that may include cellular delegations consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to distributing cellular signals, more particular aspects relate to distributing cellular signals for location tracking. While the present disclosure is not necessarily limited to such applications, various aspects of the disclosure may be appreciated through a discussion of various examples using this context.

Cellular networks (cell networks) may provide users with network connectivity across vast geographic areas. In detail, cell networks may comprise a plurality of antennas (alternatively, base stations). Each antenna of the plurality may provide connectivity to a separate geographic area (cell) of the cell network. The cell networks may connect to a packet-based network (e.g. the Internet). The cell networks may also connect to the public telephone system through telephone switches. Some of the cells may be a quarter or a half of a mile in diameter. Some of the cells may be larger, such as five to twenty-five miles in diameter. Each of the cells may project messages to multiple clients through radio waves. Each of the cells may also receive responses from multiple clients through radio waves. Each cell may overlap with adjacent cells, thereby providing contiguous coverage for cellular clients. The overlap may be slight to prevent wasted power being used by each of the base stations. In some embodiments, each cell may operate on a slightly different range of frequencies from adjacent cells to minimize inference. In some embodiments, each cell may operate based on a radio link protocol to ensure data integrity.

Cellular clients may utilize the cellular networks to enable users to perform location tracking. For example, a cellular phone (cellphone) may utilize a cell network to send and receive data by a transceiver (radio) physically coupled to the cellphone. To connect with the cell network, the cellphone may need to constantly provide power to the radio. As a user travels through a first area serviced by a first cell, the cellphone may be in communication with a first base station. This communication may inform the cell network that the cellphone is located within the first cell. Additionally the cellphone may continually receive echo requests (pings) from the first base station. The cellphone may transmit echo responses (pongs) in response to the echo requests. The cellphone may utilize this information to determine its location (e.g., latitude and longitude) either in detail or approximately, such as within a certain radius.

If the user moves outside of the first cell, the cellular network may determine that the cellphone has traveled to a second cell. The cell network may determine the movement of the cellphone based upon the pings and pongs to and from the cellphone. The cell network may instruct a second base station, located within the second cell, to locate (through a second set of pings and pongs) and provide service to the cellphone. To continue determining its location, the cellphone may continually provide power to its radio. In some embodiments, to maintain location tracking of itself the cellphone may also continually power other cellular functionalities (e.g., cellular processors, other electronics related to cellular functions, modules for applying software algorithms related to cellular functions, etc.).

The continual power draw of the cellular functionality may reduce the usability of cellphones. Cellphones may use a significant percentage of battery to power the cellular functionality. With the advent of the internet and the smartphone, cellphones have become indispensable devices used all day and everywhere (e.g., communicating with others, consuming media, playing games, activating payment methodologies, shopping, etc.). This ubiquity has led to various efforts to alleviate the battery issues surrounding cellular connectivity. Battery technology may increase every year, but cellphones may increase in usage and power consumption at a rate that is greater than the increase in battery longevity. To alleviate congestion, some cellphones utilize secondary networks to maintain network availability, such as using a wireless access point connected to the Internet. Unfortunately, this type of wireless Internet fallback may only be useful when a cellphone is within the limited range of such a network. Users may be able to extend battery life by disabling cellular functionality (e.g., by using an airplane mode). This may, however, eliminate much of the usefulness of the cellphone while the cellular functionality is disabled.

Battery usage issues may be solved by phone manufacturers creating larger cellphones. But any increase in size of a cellphone may be offset by larger screens that consume any additional power output. Some phone cases may contain additional batteries that improve battery life, but are often unwieldy to travel with because they increase the heft of the cellphone. Detachable phone accessories may include external batteries providing additional power to cellphones. However, detachable batteries may increase complexity and may be easily lost or misplaced. In addition, wearable computing devices (e.g., smart watches) may also provide cellular functionality. Unfortunately, wearable computing devices may be unable to include larger batteries because of ergonomic or aesthetic reasons. In cases of adjusting the size of the battery, the underlying problem of usage rate of the battery may not be alleviated but only masked. Inherent problems, such as power consumption and recharge times may continue to exist.

A distributed cellular delegation may enable cellular phones to perform location tracking from a cellular service provider while reducing resource usage such as client battery usage and cellular network congestion. The distributed cellular delegation may comprise a set of cellular clients (e.g., one or more smartphones, one or more cellular-equipped personal computers, etc.) communicating through one or more non-cellular connections. The distributed cellular delegation may provide efficient utilization by distributing cellular responsibility between the cellular clients. The cellular responsibility may be initiated from one or more of the cellular clients. The cellular responsibility may be initiated from a cellular service provider of the one or more clients.

FIG. 1 depicts an example location tracking network 100 that may include cellular delegations consistent with embodiments of the present disclosure. The location tracking network 100 may comprise a cellular service provider 110; a plurality of cellular towers 120A, 120B, 120C, 120D, and 120E (collectively, 120) (antennas); a plurality of isolated cellular clients 130A, 130B, 130C, and 130D (collectively, 130); a distributed cellular delegation 140; and a plurality of distributed cellular clients 150A, 150B, and 150C (collectively, 150). In some embodiments, the location tracking network 100 may comprise secondary networks 160A, 160B, and 160C (collectively, 160). The secondary networks 160 may be wireless local area networks created by residential or commercial users (e.g., homes, department stores, restaurants, etc.) providing access to the Internet.

The cellular service provider 110 may enable the cellular clients 130 and 150 to calculate their own location (cellular client location tracking). The cellular tracking may enable the user of the cellular clients 130 and 150 to determine their position with respect to the towers 120. The cellular service provider 110 may also connect cellular clients 130 and 150 to the public switched telephone service and the Internet through a variety of connections (e.g., fiber optic cables, copper cables, satellite links, microwaves, etc.). The cellular service provider 110 may comprise additional facilities (not depicted).

The cellular towers 120 may send communications to the cellular clients 130 and 150 through a spectrum of radio frequencies. The cellular towers 120 may receive communications from the cellular clients 130 and 150 through the spectrum. The cellular towers 120 may be communicatively coupled to the cellular service provider 110 through a variety of wired or wireless connections. The radio frequencies may enable the cellular clients 130 and 150 to determine location information such as latitude and longitude. Each cellular tower 120 may broadcast a unique identifier (e.g., tower 120A may broadcast a first identifier, tower 120B may broadcast a second identifier, etc.). Each cellular tower 120 may also broadcast additional information (e.g., in the form of specialized identifiers) such as the latitude and longitude of the tower.

The cellular clients 130 and 150 may comprise one or more cellular radios, one or more non-cellular radios, a microphone and speaker to enable telephone calls, and a user interface. The cellular radios may wirelessly couple the cellular clients 130 and 150 to the cellular towers 120. The cellular radios may wirelessly couple the clients 130 and 150 to other cellular towers (not depicted). The non-cellular radios may provide access to a non-cellular connection through wireless communications. The non-cellular radios may operate based upon a wireless local area network standard (e.g., Wi-Fi networks using the 802.11 standard, HiperLAN/2, etc.). In some embodiments, the non-cellular radios may operate based upon a personal area network standard (e.g., IrDA infrared communications, the Bluetooth standard, the RFID standard, the NFC standard, etc.). The non-cellular radios may enable the cellular clients 130 and 150 to connect to the secondary networks 160. The user interface may enable users to alter the settings of the cellular clients 130 and 150 or to determine the location of the cellular clients from the location tracking network 100.

The isolated cellular clients 130 may each utilize a control channel of the spectrum assigned to the cellular service provider 110. The cellular service provider may have to reduce the amount of one or more content channels to provide an adequate number of control channels to support the isolated cellular clients 130. For every performance of location tracking, each isolated cellular client 130 may send and receive multiple messages by way of the content channels and control channels. The isolated cellular clients 130 may also continually send and receive messages through the content channels and control channels for other communications (e.g., a smartphone continually communicates to a cellular tower that it is available for a phone call, a cellular-connected tablet continually communicates to a cellular tower that it is available to receive a notification, etc.). Also, each of the isolated cellular clients 130 may expend a large portion of its battery to maintain connectivity to the cellular network 100.

The distributed cellular delegation 140 may alleviate congestion of the cellular network 100 and may reduce battery usage of the distributed cellular clients 150. The distributed cellular delegation 140 may be created by the cellular service provider 110 (e.g., the cellular service provider may determine that the distributed cellular clients 150 are part of a family plan). The distributed cellular delegation 140 may be created by the distributed cellular clients 150 (e.g., a user may utilize the user interface of cellular client 150A to indicate that the user wants to participate in a delegation whenever possible).

In some embodiments, if one or more of the distributed cellular clients 150 are within proximity of each other, the distributed cellular delegation 140 may be activated. The distributed cellular clients 150 may use the non-cellular radios to determine they are within proximity of each other. The proximity may be determined by a direct communication between the distributed cellular clients 150 (e.g., a message from client 150B through Bluetooth to client 150C). The proximity may be determined by an indirect communication between the distributed cellular clients 150 (e.g., a message being broadcast through a non-cellular wireless base-station 160C may inform client 150A that client 150B is at an appropriate range for a delegation).

If the distributed cellular delegation 140 has been activated, one client of the distributed cellular clients 150 may be assigned to perform cellular infrastructure forwarding of the nearby cellular towers to the other clients of the distributed cellular delegation. Cellular infrastructure forwarding may include sending information about the cellular towers 120 from one distributed cellular client 150 to another. Cellular infrastructure forwarding may include sending identifiers corresponding to the cellular towers 120. Cellular infrastructure forwarding may include sending other information regarding the cellular towers 120, such as the signal from the towers, the latency from the towers, or the geographic location of the towers.

For example, in the depicted scenario, distributed cellular client 150C has been assigned to send information about cellular towers 120C and 120E to both distributed cellular client 150A and distributed cellular client 150B. The assignment may be determined by distributed cellular client 150C. The assignment may be determined by distributed cellular client 150B. In some embodiments, the assignment may be determined by multiple clients, such as client 150A and 150C. In some embodiments, the assignment may be determined by the cellular service provider 110. The assignment may be communicated between the clients 150 through use of the non-cellular radios. In some embodiments, the assignment may be communication between the clients 150 through use of the cellular radios.

The assignment of the responsibility for forwarding cellular tower information may be based on a variety of factors. The factors may relate to the operation status of the clients 150 (e.g., whether one of the clients is currently active and using the cellular network to make a telephone call or stream a song). The factors may relate to the cellular signal of the clients 150 (e.g., whether one of the clients has a stronger signal to a cellular tower). The factors may relate to the battery status of the clients 150 (e.g., one of the clients may have more battery than other clients, one of the clients may be plugged into a power outlet and actively charging while other clients are unplugged). The assignment may alternate periodically (e.g., client 150C may forward antenna information for five minutes and then client 150A may forward antenna information for seven minutes, client 150C may forward antenna information until a message is sent to client 150B and client 150B has activated its cellular functionality to receive the message, client 150C may forward antenna information until client 150A instructs clients 150C to stop, client 150C may forward antenna information for client 150B until client 150B is no longer communicating with client 150C by use of non-cellular radios, etc.).

Once distributed cellular client 150C has been assigned to forward tower infrastructure and other cellular information, the other distributed cellular clients 150A and 150B may disable cellular functionality (e.g., clients 150A and 150B may turn off power to their cellular radios, clients 150A and 150B may put their cellular functionalities into a sleep-state, etc.). Client 150C may listen with its cellular radio for cellular communications from the cellular tower 120E or from the other nearby cellular towers 120C and 120D.

Client 150C may forward an identifier received from tower 120E to the other distributed cellular clients 150A and 150B. The identifier may be related to the tower 120E and may be in a known format (e.g., an identifier conforming to all or part of the location area identity standard of a public land mobile network system, an identifier that uniquely identifies tower 120E, etc.). Client 150C may forward other parameters related to cellular tower 120E (e.g., the signal strength of tower 120E, the coverage area serviced by tower 120E, etc.). Client 150C may send requests (pings) to and receive responses (pongs) from tower 120E, and may forward the pings and pongs to the other distributed cellular clients 150A and 150B. Client 150C may also transmit messages to the cellular tower 120 while preforming cellular infrastructure forwarding to the other clients 150A and 150B (e.g., pongs, location updates, heartbeats, etc.).

The other distributed cellular clients 150A and 150B may track their location based on the information about the cellular towers 120 provided from the distributed cellular delegation 140. For example client 150A may track its location based on the identifier given to it from distributed cellular client 150C (e.g., may provide an estimate of its location near tower 120E). Client 150A may track its location based on multiple identifiers given to it from the distributed cellular client 150C (e.g., may provide an estimate of its location near towers 120E and 120C). Client 150A may also track its location based on the secondary network 160C. Client 150A may utilize one or more algorithms to track its location (e.g., unilateration, triangulation, trilateration, multilateration, etc.). Client 150A may utilize secondary systems for tracking its position (e.g., past calculations of position, common routes of the user, heavily trafficked routes by other users, secondary networks 160, global positioning systems, stored mapping data, and combinations thereof).

Because distributed cellular client 150C performs cellular forwarding roles for clients 150A and 150B, the performance of the cellular service provider 110 may be increased. In some embodiments, clients 150A and 150B may not use any control channels. The unused control channels may allow for increased numbers of cellular clients (not depicted) to connect to the cellular service provider 110. In some embodiments, the cellular service provider 110 may instruct the cellular towers 120 to allocate less frequencies of spectrum due to the distributed cellular delegation 140. The cellular tower 120 may allocate more frequencies of spectrum as content channels—increasing bandwidth for the clients 130 and 150.

Because distributed cellular client 150C performs cellular forwarding roles for clients 150A and 150B, battery usage may be reduced. While clients 150A and 150B are a part of the distributed cellular delegation 140, they may disable cellular functionality. In some embodiments, clients 150A and 150B may see increased battery performance because the cellular functionality is not constantly using battery (e.g., the batteries may last longer, recharging of battery may occur more quickly, etc.). In some embodiments, clients 130 may see increased battery performance because of the reduced number of clients 130 and 150 simultaneously trying to communicate with the cellular tower 120.

Figure 2:
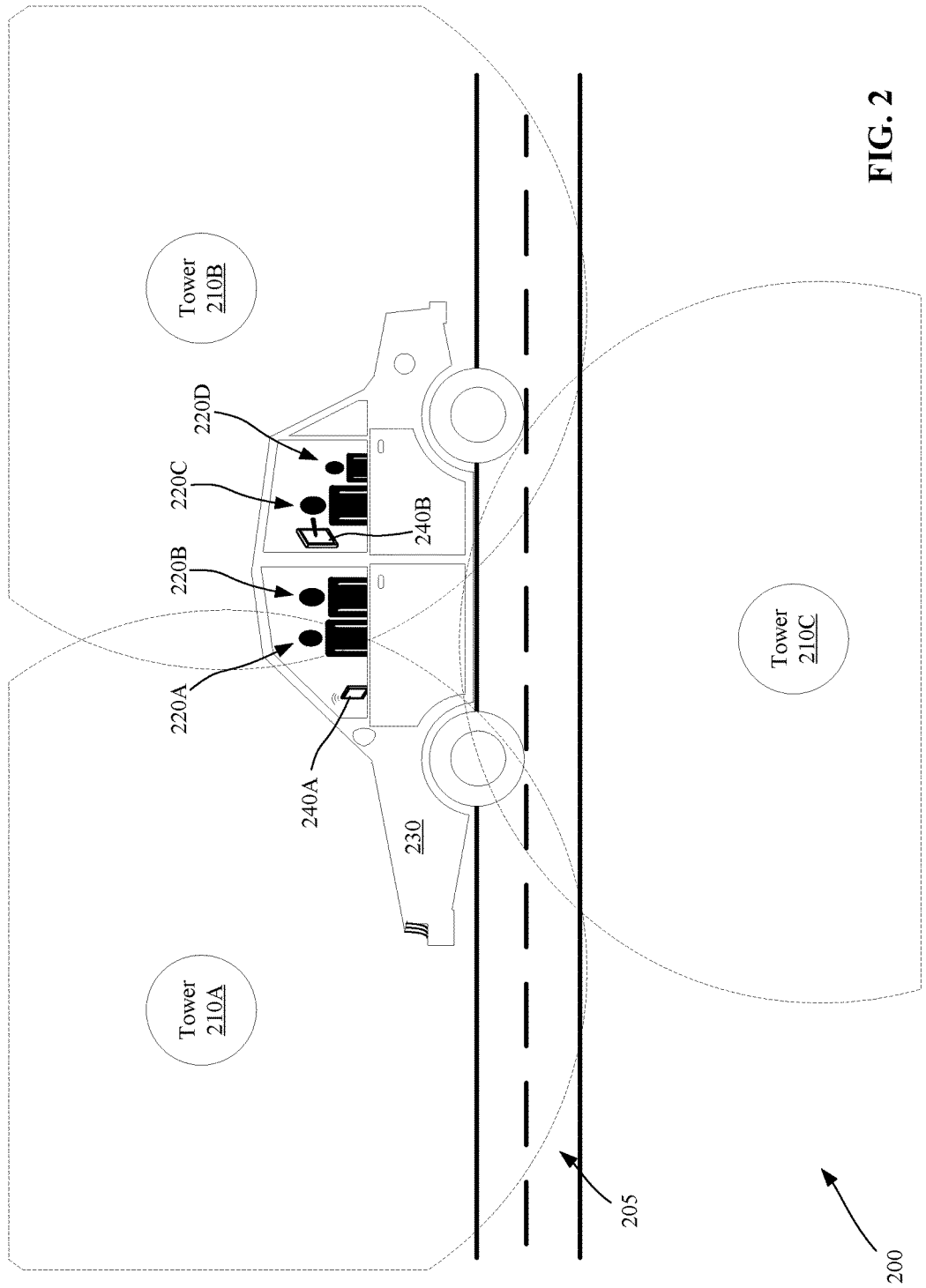
FIG. 2 depicts an example real-world scenario utilizing distributed cellular client tracking consistent with embodiments of the present disclosure.

FIG. 2 depicts an example real-world scenario 200 utilizing distributed cellular client tracking consistent with embodiments of the present disclosure. Scenario 200 is a trip that four users 220A, 220B, 220C, and 220D (collectively, 220) may embark upon to a location (e.g., a zoo, a sporting event, a restaurant, etc.). User 220B may be driving an automobile 230 along a roadway 205 with proximate cellular towers 210A, 210B, and 210C (collectively, 210). The towers 210 each have a unique identifier that may be broadcast to anyone within proximate distance of the roadway 205. User 220A may have a cellphone 240A, and user 220C may have a cellular-connected tablet 240B.

User 220A may plug cellphone 240A into a power socket (not depicted) in the automobile 230 to charge the battery of the cellphone. Cellular-connected tablet 240B (tablet) may detect that cellphone 240A is connected to a power source. The tablet 240B may request cellphone 240A to perform cellular infrastructure forwarding to the tablet 240B. In response to the request from tablet 240B, cellphone 240A may create a distributed cellular delegation. Cellphone 240A may also send a confirmation to tablet 240B that the cellphone will perform cellular infrastructure forwarding to the tablet.

The tablet 240B may disable its cellular radio or other cellular functionality to conserve battery. User 220C may launch a program (not depicted) from tablet 240B to determine the location of the automobile 230. The tablet 240B may receive identifiers indicative of tower 210B from the cellphone 240A. Tablet 240B may compare the identifier to tower data stored on the tablet to track the location of the tablet. Tablet 240B may also analyze other data stored on the tablet to track its location, such as the location of roadways with respect to tower 210B. Tablet 240B may update the program to indicate to user 220C the location of the automobile 230 based on the tower data and other data.

The tablet 240B may receive from cellphone 240A additional identifiers indicative of the other towers 210A and 210C, in addition to another identifier indicative of tower 210B. As the automobile 230 moves down the roadway 205 and away from tower 210B, the tablet 240B may receive from cellphone 204A further identifiers indicative of towers 210A and 210C, but may stop receiving identifiers indicative of tower 210B. The tablet 240B may continue to track its location based upon the identifiers. Tablet 240B may refine its location based upon the increased number of identifiers sent from the cellphone 240A. The tablet 240B may use information about the towers 210 individually. The tablet 240B may use the information about the towers 210 collectively (e.g., the order the towers were encountered, the signal strength of the towers, etc.). Tablet 240B may update the program to indicate to user 220C the location of the automobile 230 based on the identifiers indicative of the towers 210. The tablet 240B may provide additional information to user 220C from the identifiers (e.g., the speed the users 220 are traveling in miles per hour, the number of miles traveled, the distance from any destination, points of interest along the roadway 205, etc.).

The tablet 240B may provide the information to the user 220C by determining its position by comparing the indicators with a data source stored on tablet 240B (e.g., a directory of various towers and their respective locations). The tablet 240B may utilize triangulation (or other forms of location algorithms) to determine its place and provide that information to the user 220C. In some embodiments, after tablet 240B calculates the position of the users 220 based on the identifiers received from the cellphone 240A, tablet 240B may send the calculated location back to cellphone 240A—alleviating calculation cycles from cellphone 240A.

Figure 3:
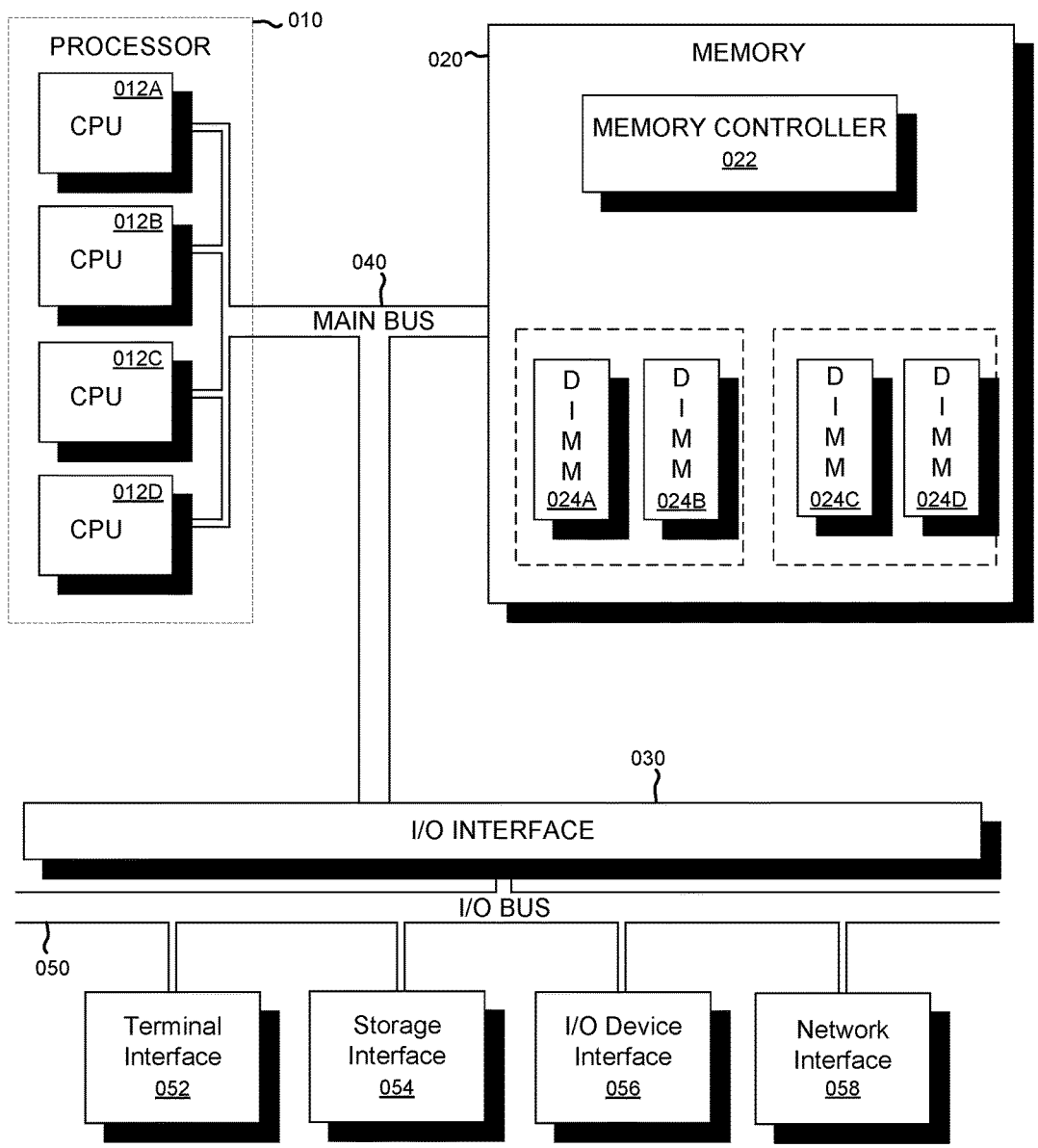
FIG. 3 depicts the representative major components of an exemplary computer system that may be consistent with embodiments of the present disclosure.

FIG. 3 depicts the representative major components of an exemplary computer system 001 that may be used, in accordance with embodiments of the invention. It is appreciated that individual components may have greater complexity than represented in FIG. 3, components other than or in addition to those shown in FIG. 3 may be present, and the number, type, and configuration of such components may vary. Several particular examples of such complexities or additional variations are disclosed herein. The particular examples disclosed are for exemplar purposes only and are not necessarily the only such variations. The computer system 001 may comprise a processor 010, memory 020, an input/output interface (herein I/O or I/O interface) 030, and a main bus 040. The main bus 040 may provide communication pathways for the other components of the computer system 001. In some embodiments, the main bus 040 may connect to other components such as a specialized digital signal processor (not depicted). The computer system 001 may be in the form of a smart phone or a cellular-connected tablet computer.

The processor 010 of the computer system 001 may be comprised of one or more CPUs 012A, 012B, 012C, 012D (herein 012). The processor 010 may additionally be comprised of one or more memory buffers or caches (not depicted) that provide temporary storage of instructions and data for the CPUs 012. The CPUs 012 may perform instructions on input provided from the caches or from the memory 020 and output the result to caches or the memory. The CPUs 012 may be comprised of one or more circuits configured to perform one or methods consistent with embodiments of the invention. In some embodiments, the computer system 001 may contain multiple processors 010 typical of a relatively large system; however, in other embodiments the computer system may alternatively be a single processor with a singular CPU 012.

The memory 020 of the computer system 001 may be comprised of a memory controller 022 and one or more memory modules 024A, 024B, 024C, 024D (herein 024). In some embodiments, the memory 020 may comprise a random-access semiconductor memory, storage device, or storage medium (either volatile or non-volatile) for storing data and programs. The memory controller 022 may communicate with the processor 010 facilitating storage and retrieval of information in the memory modules 024. The memory controller 022 may communicate with the I/O interface 030 facilitating storage and retrieval of input or output in the memory modules 024. In some embodiments, the memory modules 024 may be dual in-line memory modules or DIMMs.

The I/O interface 030 may comprise an I/O bus 050, a terminal interface 052, a storage interface 054, an I/O device interface 056, and a network interface 058. The I/O interface 030 may connect the main bus 040 to the I/O bus 050. The I/O interface 030 may direct instructions and data from the processor 010 and memory 030 to the various interfaces of the I/O bus 050. The I/O interface 030 may also direct instructions and data from the various interfaces of the I/O bus 050 to the processor 010 and memory 030. The various interfaces may comprise the terminal interface 052, the storage interface 054, the I/O device interface 056, and the network interface 058. In some embodiments, the various interfaces may comprise a subset of the aforementioned interfaces (e.g., an embedded computer system in an industrial application may not include the terminal interface 052 and the storage interface 054).

Logic modules throughout the computer system 001—including but not limited to the memory 020, the processor 010, and the I/O interface 030—may communicate failures and changes to one or more components to a hypervisor or operating system (not depicted). The hypervisor or the operating system may be allocate the various resources available in the computer system 001 and track the location of data in memory 020 and of processes assigned to various CPUs 012. In embodiments that combine or rearrange elements, aspects of the logic modules capabilities may be combined or redistributed. These variations would be apparent to one skilled in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for determining geographic location, the method comprising:
    disabling, by a first cellular client, a cellular functionality of the first cellular client;
    receiving, by the first cellular client and by way of a non-cellular connection, a first identifier from a second cellular client, the first identifier related to a first antenna of a cellular service-provider;
    tracking, by the first cellular client, the location of the first cellular client based on the first identifier;
    determining, by the first cellular client, that the first cellular client has been assigned to perform cellular infrastructure forwarding to the second cellular client;
    enabling, by the first cellular client, the cellular functionality of the first cellular client;
    receiving, by the first cellular client and by way of the cellular functionality, a third identifier from the cellular service-provider; and
    sending by the first cellular client and by way of the non-cellular connection, the third identifier to the second cellular client so that the second cellular client is able to track the location of the second cellular client based on the third identifier.

2. The method of claim 1 wherein the tracking is based on a first antenna parameter related to the first antenna of the cellular service provider, the method further comprising:
    receiving, by the first cellular client and by way of the non-cellular connection, the first antenna parameter from the second cellular client.

3. The method of claim 2 wherein the first antenna parameter is selected from the group consisting of the latency of the first antenna, the signal strength of the first antenna, the latitude of the first antenna, and the longitude of the first antenna.

4. The method of claim 1 wherein the tracking is also based on a second identifier, the method further comprising:
    receiving, by the first cellular client and by way of the non-cellular connection, the second identifier from the second cellular client, the second identifier related to a second antenna of the cellular service provider.

5. The method of claim 1 wherein the non-cellular connection is a personal area network.

6. The method of claim 1 wherein the tracking is further based on a secondary network, the method further comprising:
    retrieving, by the first cellular client, the secondary network from a secondary connection.

7. The method of claim 6 wherein the secondary connection is provided by a wireless local area network base station.

8. The method of claim 7 wherein the secondary location parameter is selected from the group consisting of the internet protocol address of the secondary connection, the latitude of the secondary wireless local area network base station, the longitude of the wireless local area network base station, and the signal strength of the secondary connection.

* * * * *